3,847,883
METHOD OF PREPARING POLYMERS UTILIZING AS CATALYSTS HYDROCARBON-SOLUBLE COMPLEXES OF AN ORGANOMAGNESIUM COMPOUND WITH A GROUP I ORGANOMETALLIC COMPOUND
Conrad W. Kamienski, Gastonia, N.C., and Jerome F. Eastham, Memphis, Tenn., assignors to Gulf Resources & Chemical Corporation, Houston, Tex.
No Drawing. Original application July 23, 1970, Ser. No. 57,820, now Patent No. 3,742,077. Divided and this application Aug. 30, 1972, Ser. No. 285,067
Int. Cl. C08f 1/28, 1/32, 19/08
U.S. Cl. 260—83.7   12 Claims

ABSTRACT OF THE DISCLOSURE

Polymerization of monomers such as butadienes and styrene, utilizing, as catalysts, hydrocarbon-soluble organometallic complexes of metals of Groups I and IIa of the Periodic System, exemplified by complexes of di-$n$-butylmagnesium with $n$-butyllithium or $n$-butylpotassium.

---

This application is a continuation-in-part of application Ser. No. 57,820, filed July 23, 1970, now Pat. No. 3,742,077, said aplication Ser. No. 57,820 being a continuation-in-part of application Ser. No. 728,838, filed May 13, 1968, now abandoned.

This invention relates to the polymerization of various polymerizable monomers in the presence of hydrocarbon-soluble organometallic complexes of metals of Group I and of organomagnesium compounds as anionic catalysts.

In our aforesaid copending application, Ser. No. 278,838, filed May 13, 1968, now abandoned, we have disclosed various complexes of diorganomagnesiums with various organometallic compounds of metals of Group I of the Periodic System, illustrative of such complexes being di-$n$-butylmagnesium complexes with alkyllithiums such as sec-butyllithium and $n$-butyllithium. Primary, linear dialkylmagnesium compounds are normally insoluble in liquid hydrocarbon solvents, whereas secondary and tertiary as well as certain primary nonlinear dialkylmagnesium compounds are generally quite soluble in liquid hydrocarbon solvents. In our said copending application, we have disclosed that alkyllithiums which may be represented by the formula RLi where R is alkyl, when complexed with hydrocarbon-insoluble diorganomagnesiums, which may be represented by the formula RR'Mg where R and R' are the same or different organo radicals, produce complexes which are soluble in various liquid hydrocarbon solvents. The complexes are disclosed in our said copending application as useful for a number of purposes, among which are as catalysts in certain types of polymerization reactions.

In the procedures described in our aforementioned copending application, referring, by way of illustration, to the preparation of a complex of di-$n$-butylmagnesium with sec-butyllithium and $n$-butyllithium, the di-$n$-butylmagnesium is initially produced by a procedure involving utilizing an "activated" powdered, anhydrous MgCl$_2$ and wherein powdered anhydrous MgCl$_2$ is mixed with anhydrous benzene, anhydrous ethyl ether is added, followed by the addition of $n$-butyllithium in benzene. After cooling, allowing the mixture to come to room temperature, stirring for 14 to 16 hours, separating the supernatant, adding additional $n$-butyllithium in benzene and distilling and heating, a slurry is recovered containing the di-$n$-butylmagnesium. The slurry is then mixed with sec-butyllithium in cyclohexane and $n$-butyllithium in a mixture of hexane and cyclohexane and, after mixing well, the mixture is subjected to centrifugation. A solution of a complex results of di-$n$-butylmagnesium with sec-butyllithium and $n$-butyllithium.

In the polymerizations carried out in accordance with our present invention, the hydrocarbon-soluble complexes used as anionic catalysts are prepared by relatively simple methods. Thus, for instance, their methods of production generally fall into two categories.

In the first method, illusttrated by the production of a complex of a hydrocarbon-insoluble primary, linear dialkylmagnesium with an alkyllithium, a hydrocarbon soluble mixed dialkylmagnesium complex is formed. The primary, linear dialkylmagnesium compound is prepared directly in the hydrocarbon solvent from magnesium metal and the corresponding alkyl halide by known methods. Then, an amount of a secondary or tertiary alkyllithium equivalent to form 5 to 100% of the primary, linear dialkylmagnesium compound formed in the first step is added to react with the by-product MgCl$_2$ formed in the direct preparation step. The resulting liquid solution is separated from the solids and said liquid solution containing a complex of a primary dialkylmagnesium with a secondary or tertitary dialkylmagnesium is then complexed with $n$-butyllithium or other Group I metal organic compounds.

In the second method, any desired alkyllithium is added in sufficient quantity to both react with all of the by-product MgCl$_2$ and also to form a complex with the so-prepared dialkyl magnesium compound, for example:

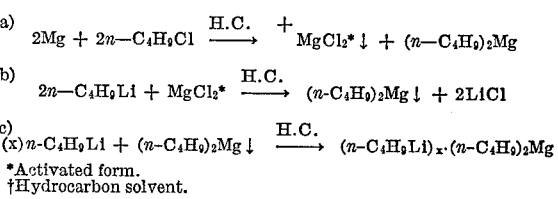

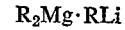

*Activated form.
†Hydrocarbon solvent.

This treatment results in the formation of a hydrocarbon-soluble organolithium-diorganomagnesium complex. The term "$x$" in equation (c) above can vary from 0.5 to 10 or even higher if desired, but generally will not be greater than 5. Preferred mole ratios of organolithium to diorganomagnesium are from 0.5 to 2 moles of the organolithium to 1 mole of the diorganomagnesium.

The hydrocarbon-soluble diorganomagnesium complexes derived from the practice of the first method can be utilized as solubilizing agents for other hydrocarbon-insoluble organometallics of Group I meals such as $n$-butylsodium and $n$-butylpotassium in hydrocarbon media. For example, admixture of one molar equivalent of a hydrocarbon-soluble $n$-butyl-sec-butylmagnesium (in a mixture of benzene and hexane) formed as described above, with solid $n$-butylsodium immediately causes dissolution of the $n$-butylsodium to produce the desired hydrocarbon-soluble complex. Apparently a 1:1 molar complex is favored since only about one molar equivalent of $n$-butylsodium is dissolved even in the presence of an excess of this reagent.

The methods described above enable the ready preparation of hydrocarbon solutions of diorganomagnesium complexes of alkali metal alkyls useful in the practice of our invention. Thus, not only binary systems, such as $$R_2Mg \cdot RLi$$

or R$_2$Mg·RNa, but, also, ternary complexes, such as R$_2$Mg·RLi·RNa can be produced. Such ternary complexes, in contradistinction to some of the binary systems described above, are not necessarily stoichiometric and many different hydrocarbon-soluble complexes with varying ratios of Mg: Li: Na can be prepared.

The advantages of both the hydrocarbon-soluble binary and ternary organometallic complexes of Groups I and IIa are many. First of all, such complexes allow for the greater ease of handling of normally hydrocarbon-insoluble organomagnesium and organoalkali reagents, such as di-*n*-propylmagnesium, di-*n*-butylmagnesium, *n*-butylsodium, *n*-amylpotassium and the like. These latter compounds are all highly pyrophoric in the solid state and must be handled in a dry box.

The hydrocarbon solutions of their binary and ternary complexes, on the other hand, can readily be dispensed from glass bottles fitted with rubber septa, by means of hypodermic syringes, without the danger of instant flammability inherent in the solid organometallics. Another advantage to be found in the hydrocarbon solutions of the complexes is their high degree of stability relative to the uncomplexed solid reagents, such as alkylsodium and alkylpotassium reagents. These reagents are known to be highly unstable even at ambient temperatures, decomposing within a few days to unsaturates and alkali hydrides, and often unwanted rearrangements occur.

The organomagnesium components of the complexes used in accordance with the present invention exert a moderating effect on the Group I components both in conferring stability on them and in decreasing their reactivity in polymerization reactions.

As indicated above, in connection wtih alkali metal alkyls, such as alkyllithiums and alkylsodiums, and the same is true of complexes of alkyllithiums and alkylsodiums, exemplified by *n*-butyllithium and *n*-butylsodium, such have been conventionally prepared in ethers, such as diethyl ether and tetrahydrofuran. However, said alkali metal alkyls and their complexes react with ethers, in some cases rather readily, and, therefore, they are relatively unsatisfactory. In sharp contrast, the complexes are formed and, particularly, are used in the presence of major quantities of liquid hydrocarbon solvents, and, therefore, such unwanted side reactions are avoided. The presence of small proportions of Lewis base ethers or aliphatic tertiary amines is not excluded in the practice of our invention although, generally, it is not necessary to employ them.

It is particularly advantageous to utilize, as the organomagnesium compounds of the compositions or complexes or the like which are used in the polymerization method of the present invention, (a) dialkylmagnesiums in which each alkyl contains from 3 to 6 carbon atoms, with (b) $C_3$-$C_6$ alkylmetallic compounds in which the metals of said alkylmetallic compounds are Group I metals, namely, one or more from the group of lithium, sodium, potassium, rubidium and cesium, especially the *n*-butylmetallic compounds. However, in one aspect of the broader phases of the invention, the Group I organometallic compounds and the organomagnesium compounds employed in the production of the compositions or complexes or the like made and utilized in the practice of the present invention can comprise $C_2$-$C_{14}$ hydrocarbon organo radicals, said organo radicals being, for instance, cycloalkyl, cycloalkenylalkyl, arylalkyl, arylcycloalkyl, cycloalkylaryl, and the like. Still other types of organo radicals that can be used are those of heterocyclic character, such as 2-pyridyl and 2-thienyl; ethylenically unsaturated organo radicals such as vinyl, allyl and propenyl; polyfunctional organo radicals such as alkylene and polymethylenes as, for example, 1,4-tetramethylene and 1,5-pentamethylene.

Many of the said binary organometallic complexes can be represented by the formula $$x(RM) \cdot y(R^1R^2M^1)$$

where R, $R^1$ and $R^2$ are the same or dissimilar $C_2$-$C_{14}$ hydrocarbon organo radicals; M is a Group I metal, $M^1$ is magnesium; and $x$ and $y$ are integers reflecting the molar ratios of the respective organometallic compounds comprising the compositions or complexes, the values of $x$ and $y$ commonly involved being indicated hereafter. Illustrative examples of said hydrocarbon organo radicals, in addition to those previously mentioned, are *n*-propyl; *n*-butyl; *sec*-butyl; *n*-amyl; *tert*-amyl; *n*-octyl; *n*-undecyl; *n*-decyl; *n*-dodecyl; 2-methyl-2-butenyl; cyclopentyl-methyl; cyclohexyl - ethyl; cyclopentyl - ethyl; methylcyclopentyl-ethyl; 4-cyclohexenyl-ethyl; alphanaphthyl-ethyl; cyclopentyl; cyclohexyl; methylcyclopentyl; dimethylcyclopentyl; ethylcyclopentyl; methylcyclohexyl; dimethylcyclohexyl; ethylcyclo-hexyl; isopropylcyclohexyl; phenyl-ethyl; phenylcyclohexyl; phenyl; tolyl; xylyl; benzyl; naphthyl; methylnaphthyl; dimethylnaphthyl; ethyl-naphthyl; cyclohexylbutyl; 2,7-dimethylocta-2,6-dien-1,8-yl; 2,6-dimethylocta-2,6-dien-1,8-yl; and bis ($\alpha$-2-methylbutyl)-*m*-xylyl.

Hydrocarbon-soluble complexes are formed by combination of (a) Group I organometallics such as alkyllithium, alkylsodium, alkylpotassium, alkylrubidium and alkylcesium, examples of which are *n*-butyllithium, *sec*-butyllithium, *n*-butylsodium and *n*-amylpotassium; aryllithium, arylsodium, arylpotassium compounds, examples of which are phenyllithium, 2-naphthylsodium, and 9-anthrylpotassium; chain extended dialkali metal adducts of conjugated dienes such as the chain extended dilithioadducts and dipotassioadducts of isoprene and of 1,3-butadiene and of 1,3-divinylbenzene (see U.S. Pat. Nos. 3,294,768; 3,388,178 and 3,468,970) some of which adducts can be represented by the formulae $C_{10}H_{14}Li_2$ and $C_{10}H_{14}K_2$; and aralkyllithium, aralkylsodium and aralkylpotassium compounds, examples of which are benzyllithium, diphenylmethylsodium and $\alpha$-cumylpotassium, with (b) organomagnesium compounds such as dialkylmagnesiums, examples of which are di-*n*-butylmagnesium, *n*-butyl-*sec*-butylmagnesium and *n*-amyl-*sec*-butylmagnesium; and arylalkylmagnesium compounds, an example of which is phenyl-*sec*-butylmagnesium; and aralkylalkylmagnesium compounds, an example of which is benzyl-*sec*-butylmagnesium. Ternary complexes may be formed by admixture of any two Group I organometallics with one organomagnesium compound, or vice versa.

Specific illustrative examples of complexes utilized in the practice of our invention are the following, omitting the molar ratios of the Group I and organometallics and organomagnesium compounds making up said complexes.

(1)             PhLi·(*sec*-Bu)$_2$Mg
(2)             TolylLi·*n*-(Am)$_2$Mg·(*sec*-Bu)$_2$Mg
(3)             BenzylLi·(*sec*-Bu)$_2$Mg
(4)             $C_{10}H_{14}Li_2$·(*sec*-Bu)$_2$Mg
(5)             $C_{10}H_{14}Li_2$·$C_{10}H_{14}K_2$·(*sec*-$C_5H_{11}$)$_2$Mg
(6)             $C_{10}H_{14}Li_2$·$C_{10}H_{14}K_2$·(*sec*-Am)$_2$Mg
(7)             $C_{10}H_{14}Li_2$·*n*-BuLi·(*sec*-Bu)$_2$Mg
(8)             (*n*-$C_5H_{11}$)Mg·(*sec*-$C_4H_9$)$_2$Mg·(*sec*-$C_4H_9$Li)
(9)             (*n*-$C_4H_9$)$_2$Mg·(*n*-$C_4H_9$K)
(10)            (*sec*-$C_4H_9$)$_2$Mg·(*n*-$C_4H_9$Na)
(11)            [2(*n*-$C_5H_{11}$)$_2$Mg·(*sec*-$C_4H_9$)$_2$Mg]·(*n*-$C_4H_9$Na)

Molar ratios of the Group I organometallics and the organomagnesium compound in the binary and ternary complexes may be varied over a wide range, but the most practical limits are usually from about 0.1 to 100, and, more desirably, from about 0.5 to 5.

As indicated above, the aforesaid compositions or complexes are employed in the form of solutions thereof in one or more liquid hydrocarbon solvents. Among such solvents are, by way of illustration, aliphatic and cycloaliphatic solvents such as heptane, hexane, octane, isooctane, cyclohexane and methylcyclohexane; but particularly desirable are aromatic hydrocarbons such as benzene, toluene, xylenes, and compatible mixtures of any two or more thereof. It will be understood, of course, that the different complexes will have varying solubilities in different liquid hydrocarbon solvents. However, in general, they will be found to be soluble to a substantial extent in at least most of said liquid hydrocarbon solvents to produce clear solutions.

It has been found that, although dialkylmagnesium reagents alone do not catalyze the polymerization of conjugated dienes, in combination with lithium alkyls, or other Group I metal alkyls, they act as catalysts to produce polymers of predictable molecular weight. Thus, for example, 1,3-butadiene and isoprene can be polymerized in quantitative yield with alkyllithium-dialkylmagnesium complexes wherein the alkyllithium is present in at least an equimolar amount to the dialkylmagnesium reagent. The polymer molecular weight corresponds to the utilization of all the carbon-lithium bonds and most of the carbon-magnesium bonds in the catalyst, thus definitely showing that magnesium participates in the growing polymer chain.

In polymerization reactions carried out in accordance with the present invention, the polymers which can be produced are homopolymers as well as copolymers. The monomers, which most desirably contain from 4 to 12 carbon atoms, that can be employed are conjugated dienes. They include, by way of illustration, butadienes such as 1,3-butadiene; isoprene and piperylene. Numerous others are well known to the prior art and are shown, for instance, in U.S. Pat. Nos. 3,091,606 and 3,377,404, the disclosures of which, in relation to conjugated dienes and are hereby incorporated by reference.

TABLE I.—MICROSTRUCTURE OF 1,3-BUTADIENE TELOMERS

| Catalyst type | Percent | | | |
|---|---|---|---|---|
| | Vinyl | Trans-1,4 | Cis-1,4 | Sat'd |
| n-Butyllithium | 68.9 | 7.6 | 0.0 | 23.5 |
| RR'Mg·nBuNa[a] | 76.0 | 13.0 | 7.3 | 3.7 |
| RR'Mg·nBuK[b] | 55.0 | 45.0 | 0.1 | 0.0 |

[a] R=sec-Bu, R'=n-Amyl; product contained approximately 7 mole percent RLi.
[b] R=sec-Bu, R'=n-Amyl; product contained approximately 10 mole percent RLi.

TABLE II.—PHYSICAL PROPERTIES AND YIELDS OF 1,3-BUTADIENE TELOMERS

| Catalyst type | Viscosity, poise (P) | Molecular weight | Yield (lbs./eq.) |
|---|---|---|---|
| n-Butyllithium [a] | 120 (50°) [2,000 (23°)] | 2,130 | 27 |
| RR'Mg·n-BuNa | 744 (23°) | 1,922 | 52.5 |
| RR'Mg·n-BuK | 180 (26°) | 2,220 | 50.0 |

[a] Dilithioadduct of isoprene, prepared as described in Example 1 of U.S. Pat. No. 3,388,178 gives substantially similar result.

NOTE.—Reaction conditions: Toluene, 400 ml.; TMEDA, 5 ml.; Catalyst, 0.034 eq.; Butadiene (gas), 3.5 l./m.; Temperature, 60–65° C.; Time, 2–2.5 hrs.

In those instances in which Lewis base ethers or aliphatic tertiary amines are utilized in the reaction medium in which the polymers made pursuant to the present invention are produced, illustrative examples of such ethers are linear alkyl ethers such as dimethyl ether, diethyl ether, diisopropyl ether, di-n-butyl ether and diisobutyl ether; dialkyl ethers of aliphatic polyhydric alcohols such as dimethyl ether of ethylene glycol, diethyl ether of ethylene glycol, diisopropyl ether of ethylene glycol and diisopropyl ether of diethylene glycol, and dimethyl-, diethyl- and diisopropyl ethers of propylene glycol; cyclic alkyl ethers such as tetrahydrofuran (THF), tetrahydropyran (THP), dioxane, and 7-oxa [2,2,1]-bicycloheptane (OBH); and liquid ethers in the form of azaoxa-alkanes, aza-alkyloxycycloalkanes or oxa-alkylazacycloalkanes which can be represented by the formulae:

(I) $\begin{array}{c} R^1 \\ \diagdown \\ N{-}X{-}O{-}R^3 \\ \diagup \\ R^2 \end{array}$

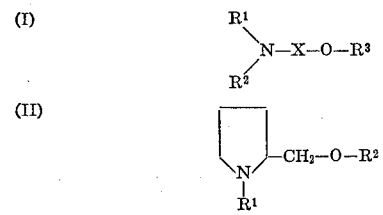

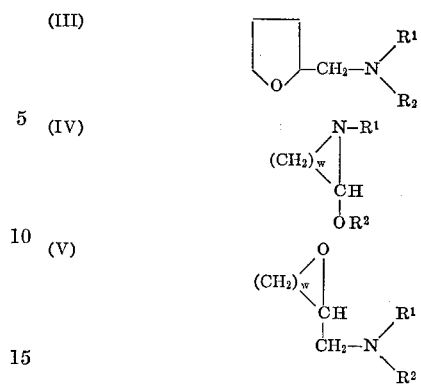

where $R^1$, $R^2$ and $R^3$ are the same or different alkyls each containing from 1 to 4 carbon atoms, namely, methyl, ethyl, n-propyl, isopropyl, n-butyl, isobutyl and tert-butyl; X is a non-reactive group such as —CH$_2$—CH$_2$—, —CH$_2$—CH$_2$—CH$_2$—, $$-CH_2-CH-CH_2-,$$
$$\quad\quad\quad |$$
$$\quad\quad\quad CH_3$$

or other divalent aliphatic hydrocarbon or alkylene radicals, preferably containing from 2 to 4 carbon atoms; and w is 1 to 4. Illustrative examples of such ethers include, for instance, 2 - dimethylaminoethylmethyl ether [(CH$_3$)$_2$—N—CH$_2$—CH$_2$—O—CH$_3$]; 2 - diethylaminoethylmethyl ether [(C$_2$H$_5$)$_2$—N—CH$_2$—CH$_2$O—CH$_3$]; and 2-dimethylaminopropylmethyl ether

[(CH$_3$)$_2$—N—CH$_2$—CH$_2$—CH$_2$—O—CH$_3$].

An illustrative dioxacycloalkane is 2,2'-di(tetrahydrofuranyl)

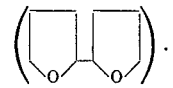

The Lewis base aliphatic tertiary amines include, by way of illustration, trimethylamine, triisopropylamine and tributylamine; and ditertiary amines such as N,N,N', N'-tetramethylethylenediamine. Other suitable Lewis base tertiary amines which can be utilized are disclosed in U.S. Pat. No. 3,206,519 and British Pat. No. 1,051,269 which, for this showing, are herewith incorporated by reference. Especially suitable, where such cocatalyst is used, are N,N,N',N' - tetramethylethylenediamine (TMEDA) and 1-dimethylamine - 2 - ethoxyethane(2-dimethylaminoethyl ethyl ether).

The following examples are illustrative of the production of compositions or complexes, and their use in polymerization reactions in accordance with the present invention. It will be understood that other compositions or complexes can be made and other polymerizations carried out in the light of the guiding principles and teachings disclosed herein. All temperatures are in degrees C.

EXAMPLE I

Preparation of Di-n-Amylmagnesium-Di-sec-Butylmagnesium

This example shows the preparation of di-n-amylmagnesium-di-sec-butylmagnesium which can then be complexed with alkali metal alkyls (as note, for instance, in Example IV).

13.4 g. of —200 mesh magnesium powder was placed in a 1-liter 3-necked flask, and covered with 50 ml. of dried methyl-cyclohexane. Then 2 ml. of a 1.0 N solution containing a complex of 1.2 equivalents of di-n-amylmagnesium and 0.8 equivalents of di-sec-butylmagnesium in hexane-cyclohexane was added to the mixture as well as 10 ml. of a solution of 53.8 g. (0.5 moles) of n-amyl chloride in 200 ml. of methylcyclohexane. Heating and stirring was begun. At 75°, reaction commenced, as observed by a rapid rise in temperature to 88° and notable thickening of the mixture. After the reaction subsided, the remainder of the halide solution was added over a 3.5 hour period. The heating was maintained to keep the temperature of the reaction mixture at about (±5°). Vigorous stirring was maintained throughout the addition. 50 ml. of solvent was then added to the mixture and heating at 80° and vigorous stirring continued for 2 hours. The mixture was allowed to cool to 60° and 30 ml. of 1.2 N sec-butyllithium (s-BuLi) in hexane added. Immediate thinning of the mixture was noted. An additional 60 ml. of said 1.2 N s-BuLi solution was added, the mixture then thinning out to the consistency of the solvent. The mixture was stirred for 1 hour and allowed to settle. The total alkalinity concentration of the clear supernatant solution was 1.09 N. An additional 75 ml. of the 1.2 N s-BuLi solution was added and the mixture stirred for 30 minutes. The mixture was then filtered to give a clear, colorless solution. The solids were washed with 100 ml. of hexane to given a total of 530 ml. of a 0.99 N solution (525 meq. of base). Substracting a total of 165×1.2 N =198 meq. of s-BuLi, and adding 22 meq. for analytical samples, there is obtained a residual of 348 meq. of base corresponding to a 70% recovered yield of di-$n$-amylmagnesium (based on starting $n$-AmCl). The GLC ratio of 1.75 $n$-amyl to 1 sec-butyl groups in the product was determined by oxidizing a 10 ml. sample with dry air, hydrolyzing and acidifying the mixture and analyzing the supernatant solution on a Carbowax 400 column at 110° C. (No correction factor was applied.) The product solution was further analyzed for Mg by EDTA titration and active alkyl content by titration with a standard solution of sec-butyl alcohol in toluene (1,10-phenanthroline was the indicator).

Found: Mg=1.02 N, A.A.=0.95 N (T.B.=0.99).

EXAMPLE II

Di-$n$-Butylmagnesium-$n$-Butyllithium Complex

To a mixture of $(n$-$C_4H_9)_2$Mg and $MgCl_2$, in an inert atmosphere, prepared from $n$-$C_4H_9$Cl and activated Mg metal, concentrated $n$-BuLi (95% in hexane), 1 ml. at a time, was added until base appeared in solution. At this point, all of the activated $MgCl_2$ had been reacted. Then a calculated amount of concentrated $n$-$C_4H_9$Li was added to make the catalyst. When the Mg:Li ratio reached 2:1, all of the di-$n$-butylmagnesium had dissolved. Further addition of lithium led to an increase in the lithium content of the solution. By this means, various ratios can be made.

EXAMPLE III

Di-$n$-Butylmagnesium-Di-sec-Butylmagnesium Complexed with $n$-Butylsodium 1 g. of $n$-butylsodium (0.0125 moles) was shaken with a mixture of 10 ml. of a 1.48 N solution (0.0074 moles) of a complex of $n$-butylmagnesium and sec-butylmagnesium (weight ratio of said $n$-butylmagnesium to said sec-butylmagnesium is 2:1) in $n$-hexane and 6 ml. of benzene. The mixture was allowed to stand for about ½ hour. If the resulting solution is not clear, such solid as may be present can be removed by centrifugation. The clear supernatant or solution, on analysis for sodium and magnesium, showed that the same contained the butylsodium and the butylmagnesiums in a mole ratio of approximately 1:1 (Found: Na: 0.44 mmoles/ml.; Mg: 0.42 moles/ml.). The apparent complex may be represented by the fromula $n$-$C_4H_9$Na·$C_4H_9)_2$Mg.

EXAMPLE IV

Di-$n$-Amylmagnesium-Di-sec-Butylmagnesium Complexed with $n$-Butylsodium and $n$-Butyllithium To 9.6 g. (0.1 mole) of sodium tert-butoxide suspended in 50 ml. of hexane was slowly added, with stirring, a volume of 129 ml. of a 2.33 N (0.3 moles) solution of $n$-butyllithium in $n$-hexane with external cooling (−10°). After allowing the contents to come to room temperature, the white $n$-butylsodium was filtered off and washed with 50 ml. of hexane. To the residual solid product after washing was added 100 ml. of a 1 N solution of the complex dialkylmagnesium compound of Example 1, prepared by mixing one equivalent of di-sec-butylmagnesium in hexane with two equivalents of di-$n$-amylmagnesium in methylcyclohexane (the complex can be indicated as [($n$-Am)$_2$Mg]$_2$·(sec-Bu)$_2$Mg. As the solid $n$-butylsodium dissolved in the dialkylmagnesium solution, a sticky, highly pyrophoric, liquid second phase separated out. The addition of 20 ml. of benzene dissolved this second phase to give, on filtration, 125 ml. of completely clear solution containing approximately equimolar quantities of the sodium and magnesium alkyls.

Found: 0.35 mmoles/ml. of Mg; 0.31 mmoles/ml. of Na. The solution also contained 0.048 mmoles/ml. of Li.

EXAMPLE V

Di-$n$-Butylmagnesium-Di-sec-Butylmagnesium Complex with $n$-Butyllithium and $n$-Butylsodium To 1.663 g. (0.02 moles) of $n$-butylsodium, as a solid white powder, was added 23 ml. of a 1.8 M solution of $n$-butyllithium in benzene and the mixture stirred thoroughly. To 5 ml. of this mixture was added 5 ml. of a 0.95 molar solution of mixed dialkylmagnesiums (in a weight ratio of 2 parts of di-$n$-butylmagnesium to 1 part of di-sec-butylmagnesium) in hexane. Heat was generated and most of the solids dissolved, yielding a slightly hazy, light orange solution. Centrifugation yielded a perfectly clear solution. Analysis of the solution for Na, Li and Mg gave the following results:

Calculated: Na, 1.75 mmoles; Li, 4.50 mmoles; Mg, 2.50 mmoles. Found: Na, 1.34 mmoles; Li, 4.34 mmoles; Mg, 2.74 mmoles.

The ternary complex (containing approximately 3Li:2Mg:1Na) produced a solution of 2.26 Normal in total alkalinity, which was stable at ambient and refrigerated temperatures.

To demonstrate the non-stoichiometry of these complexes, another combination of the three butylmetallics was made as described above, yielding, ultimately a clear, stable, 2.41 N benzene solution containing a molar ratio of 1.67 Mg:1.67Li:1Na.

EXAMPLE VI

Di-$n$-Amylmagnesium-Di-sec-Butylmagnesium Complexed with $n$-Butyllithium and $n$-Butylpotassium To a slurry of 11.2 g. (0.1 mole) of potassium tert-butoxide in 50 ml. of cyclohexane was added slowly, with stirring and ice-bath cooling, 150 ml. of a 2.5 N $n$-butyllithium solution in hexane (3.3 molar equivalents). The temperature during reaction did not rise above 25°. The resultant mixture was filtered and the solids washed with $n$-pentane. The white solids appeared to be somewhat unstable, darkening to a light brown color after several days storage in the Dry Box at room temperature. The filtrate components were also unstable, a red-brown solid precipitating out slowly. Both solids and filtrate were analyzed for K and Li.

Found in filtrate (total): Li, 244 meq.; K, 19 meq. Found in solid (1–1.5 g. sample): Li, 11 meq.; K, 6.1 meq.

To the remainder of the solid (approximately 2:1 BuLi-BuK complex) was added 190 ml. of a 1.07 N solution of a complex formed by admixing 1.5 equivalents of di-$n$-amyl-magnesium in cyclohexane and 1 equivalent of di-sec-butylmagnesium in hexane. 50 ml. of cyclohexane was added; the mixture shaken thoroughly and a 40 ml. aliquot was transferred to a centrifuge tube. After spinning the mixture down, a 10 ml. aliquot of the supernatant was analyzed for Li, K and Mg.

Found: Li, 0.28 mmoles/ml.; K, 0.06 mmoles/ml.; Mg, 0.21 mmoles/ml.

To the remaining mixture in the centrifuge tube was added 10 ml. of benzene. Most of the remaining solid dissolved. Further addition of 5 ml. benzene did not result in any further solubilization of the solids. After spinning the mixture down, a 10 ml. aliquot of the clear supernatant solution was analyzed for K, Li and Mg.

Found: Li, 0.21 mmoles/ml.; K, 0.12 mmoles/ml.; Mg, 0.26 mmoles/ml.

Mg had been dissolved from the solids by addition of benzene. Most of the remaining hexane-cyclohexane slurry of the ternary alkylmetallic salt mixture was transferred to centrifuge tubes and spun down. The supernatant was discarded and the solids washed twice with 25 ml. portions of hexane. Then, 25 ml. of benzene was added to each of the tubes and the mixture shaken thoroughly. Most of the solids dissolved. The tubes were centrifuged and the yellow clear supernatant solution analyzed for Li, K and Mg.

Found: Li, 0.072 mmoles/ml.; K, 0.269 mmoles/ml.; Mg, 0.353 mmoles/ml.

EXAMPLE VII

Di-$n$-Butylmagnesium-Di-$sec$-Butylmagnesium Complexed with $n$-Butylsodium

To 13 ml. of a 1.23 N solution of a complex formed from 2 equivalents of di-$sec$-butylmagnesium in hexane and 1 equivalent of di-$n$-butylmagnesium in cyclohexane were added 8 ml. of benzene and 1 to 2 g. of $n$-butylsodium (excess). The mixture was shaken well, spun down in the centrifuge, and the clear supernatant analyzed for Mg and Na.

Found: 0.48 mmoles/ml. Na; 0.39 mmoles/ml. Mg. (average of two results).

EXAMPLE VIII

Di-$n$-Butylmagnesium-Di-$sec$-Butylmagnesium Complexed with $n$-Butylpotassium a. To approximately 1 g. (0.01 mole) of potassium tert-butoxide suspended in 10 ml. of benzene in a centrifuge tube was added 25 ml. of a 1.22 N solution of a complex made up of 2 equivalents of di-$n$-butylmagnesium in cyclohexane and 1 equivalent of di-$sec$-butylmagnesium in hexane. The resulting suspension was spun down and the clear solution and solid analyzed for K and Mg.

Found in solution: K, 5.0 meq.; Mg, 26.8 meq. Found in solid: K, 3.5 meq.; Mg, 2.8 meq.

EXAMPLE IX

Complex of Chain-Extended Dilithioisoprene with Di-$n$-Butylmagnesium

Magnesium metal powder (6 g., 0.25 g. atoms) was reacted with neat $n$-butyl chloride (23 g., 0.5 moles) in an inert atmosphere. When the reaction mixture became viscous, 100 ml. of benzene was added slowly to thin it out. When the reaction was complete, the reaction mixture was cooled and concentrated $n$-BuLi was added in 1–2 ml. increments until a small amount of basic material remained in solution. Then a sufficient amount of a partial suspension in benzene of chain-extended dilithioisoprene was added to produce a solution with a 3:1 Li:Mg ratio. A clear red solution resulted.

EXAMPLE X

Complex of Chain-Extended Dilithioisoprene and Dimagnesioisoprene with Di-$n$-Butylmagnesium Magnesium metal powder (6 g., 0.25 g. atoms) was reacted with neat $n$-butyl chloride (23 g., 0.5 mole) in an inert atmosphere. When the reaction mixture became viscous, 100 ml. of benzene was added slowly to thin it out. When the reaction was complete, the mixture was cooled and a cloudy solution of chain-extended dilithioisoprene in benzene was added slowly. Some heat was evolved. The reaction mixture was allowed to settle and the resultant mixture was filtered. The solution was thinned out in order for the filtration to proceed at an acceptable rate. A slightly cloudy red solution resulted.

EXAMPLE XI

Complex of Butyl ($n$- and $sec$-) Potassium and Dibutyl ($n$- and $sec$-) Magnesium This Example shows the production of a binary hydrocarbon-soluble complex of a Group I alkylmetallic and a Group IIa alkylmetallic by treatment of a soluble dialkylmagnesium complex produced above with at least one molar equivalent of an alkali metal, preferably very finely dispersed in a hydrocarbon solvent and filtering the resulting solution of the said product complex of the Group I alkylmetallic and the Group IIa dialkylmetallic.

To a dispersion of 3.1 g. of potassium metal in 100 ml. of heptane was added 240 ml. of a 0.81 N solution of a 1:1 complex of di-$n$-butylmagnesium and di-$sec$-butylmagnesium in hexane-cyclohexane $(1:1)_x$ and the mixture stirred at ambient temperature for 16 hours. The product was allowed to settle out, the supernatant solution was drawn off, and the residue treated with 350 ml. of benzene. Magnesium metal and unreacted potassium metal were filtered away to give a clear solution of the 1:1 complex of butyl ($n$- and $sec$-) potassium and dibutyl ($n$- and $sec$-) magnesium in benzene. Analysis for Mg and K showed the concentration of the former to be 0.185 molar, while the concentration of the latter was found to be 0.166 molar.

EXAMPLE XII

Polymerization of 1,3-Butadiene

Into a $N_2$-purged tube was condensed 29.8 g. of 1,3-butadiene at $-78°$. The tube was warmed, weighed, checked for leaks, and then re-cooled. Cyclohexane (154.5 ml.) and 12 ml. of a 0.50 N solution (5.96 mmoles) of a 2:1 complex of $sec$-butyllithium and di-$sec$-butylmagnesium in hexane were then introduced. The mixture was warmed to 25°, agitated and allowed to stand overnight. The next day the reaction was quenched with 9 ml. of 2-propanol and 3 ml. of inhibitor solution was added. The solvent was then stripped under vacuum to constant weight, giving 30.1 g. (100%) of polybutadiene. The molecular weight, determined by VPO, was 3720.

EXAMPLE XIII

Polymerization of Isoprene 10 g. of isoprene, freshly dried and distilled, was dissolved in 31 ml. of cyclohexane, also previously dried and distilled, in a pressure bottle under an inert atmosphere. The bottle was sealed with a rubber septum. Then, 2 ml. (2.3 mmoles) of a catalyst solution of Example II with Li:Mg ratio=1:1, LiMg($n$-C$_4$H$_9$)$_3$, was added by means of a syringe through the septum. The mixture was then heated at 65° for 24 hours, cooled, and quenched with isopropanol. After evaporation of solvent, the viscous rubber was analyzed for average molecular weight by vapor phase osmometry. (Mn=3200). Weight 8.3 g. (83% yield).

EXAMPLE XIV

Polymerization of 1,3-Butadiene 23.4 g. of purified 1,3-butadiene was condensed into a pressure bottle fitted with a butyl rubber septum and crown cap. Then 115.4 ml. of purified cyclohexane was injected into the bottle and the mixture shaken to effect solution. Then 14.5 ml. of a 0.84 N solution of approximately a 1:1 complex of di-$sec$-butylmagnesium (0.28 M) and $sec$-butyllithium (0.31 M) in hexane was injected and the mixture shaken thoroughly and allowed to polymerize for 66 hours. To the mixture was then added 9 ml.

of isopropanol to quench the catalyst and 3 ml. of a 10 wt. percent N-phenyl-2-naphthylamine solution in THF, as an inhibitor. The product was thoroughly stripped of solvent until no further loss in weight was observed.

The viscous polymeric residue weighed 24.1 g. (100% yield) and had a molecular weight (by VPO) of 2239. This molecular weight corresponds to the utilization of all of the lithium and three-fourths of the magnesium as catalyst (10.5 meq. out of 12.2 meq.) according to the following well-known relationship:

$$\text{Mol. Wt.} = \frac{\text{Wt. of monomer}}{\text{Equivalents of catalyst}}$$

Substituting, $\frac{23.4 \text{ g.}}{10.5 \text{ meq.}} = 2239$ (M.W.)

The microstructure of the polymer was determined by infrared and NMR and found to be 45% cis-1,4, 45% trans-1,4; 10% vinyl.

EXAMPLE XV

Polymerization of 1,3-Butadiene

Butadiene (10 g.), freshly dried, was distilled into a pressure bottle containing 31 ml. of cyclohexane. 2 mmoles of the catalyst of Example IX was added by injection and the mixture was heated at 60° for 16–20 hours. At the end of the period, a solid rubbery compound was present. The reaction was quenched with isopropanol and the solid was evaporated, leaving a solid rubbery polymer.

EXAMPLE XVI

Polymerization of Isoprene

Isoprene (10 g.), freshly dried and distilled, was mixed with frozen cyclohexane (13 ml.) in a pressure bottle, and the bottle was sealed with a septum. 2 mmoles of the catalyst of Example IX was added by injection and the mixture was heated at 60° for 16–20 hours. At the end of the period, a solid rubbery compound was present. The reaction was quenched with isopropanol and the solid was evaporated, leaving a solid rubbery polymer.

What is claimed is:

1. In a method of preparing polymers, by polymerizing at least one conjugated diene monomer, the improvement which consists in the utilization, as the catalyst, in a hydrocarbon solvent solution, of a complex of (i) at least one organomagnesium compound with (ii) at least one organometallic compound in which the metal is a Group I metal, the organo radicals of said (i) and (ii) compounds being $C_2$–$C_{14}$ hydrocarbon radicals selected from the group of alkyl, cycloalkyl, aryl, alkylaryl, cycloalkylaryl, heterocyclic, ethylenically unsaturated organo radicals, alkylene and polyenes.

2. The method of claim 1, in which the hydrocarbon solvent is at least one member of the group of pentane, hexane, heptane, octanes, cyclohexane, cyclooctane, benzene and toluene.

3. The method of claim 1, in which the monomer is 1,3-butadiene.

4. The method of claim 1, in which 1,3-butadiene is copolymerized with styrene.

5. The method of claim 2, in which the (i) organomagnesium compound is a dialkylmagnesium in which each alkyl contains from 3 to 6 carbon atoms.

6. The method of claim 5, in which the dialkylmagnesium is selected from the group of di-$n$-butylmagnesium and di-$sec$-butylmagnesium.

7. The method of claim 2, in which the (ii) organometallic compound is an alkyl alkali metal compound in which the alkyl contains from 3 to 6 carbon atoms.

8. The method of claim 7, in which the alkyl alkali metal compound is selected from the group of $n$-butyllithium, $n$-butylsodium and $n$-butylpotassium.

9. The method of claim 3, in which the catalyst complex is a dibutylmagnesium, $n$-butyllithium or $n$-butylpotassium complex.

10. The method of claim 1, in which the (ii) organometallic compound is a polylithioadduct of a conjugated diene selected from the group of isoprene and 1,3-butadiene.

11. In a method of preparing polymers, polymerizing at least one conjugated diene monomer, the improvement which consists in the utilization, as the catalyst, of a complex of at least one dialkylmagnesium containing from 2 to 14 carbon atoms with at least one alkylmetallic compound in which the metal of said alkylmetallic compound is selected from the group of lithium, sodium, and potassium.

12. The method of claim 11, in which the monomer is 1,3-butadiene.

References Cited

UNITED STATES PATENTS

| | | | |
|---|---|---|---|
| 3,278,508 | 10/1966 | Kahle | 260—94.2 |
| 3,629,213 | 12/1971 | Onishi | 260—94.2 |
| 3,655,790 | 4/1972 | Ashby | 260—665 |
| 3,691,241 | 9/1972 | Kaminski | 260—94.2 |
| 3,716,495 | 2/1973 | Hsieh | 260—94.2 |

JAMES A. SEIDLECK, Primary Examiner

U.S. Cl. X.R.

260—82.1, 93.5 R, 94.2 M